Oct. 24, 1961 D. L. PHILLIPS 3,005,510
AUXILIARY DRIVE UNIT FOR VEHICLES
Filed March 9, 1959 3 Sheets-Sheet 1

INVENTOR:
Delbert L. Phillips

Attorneys

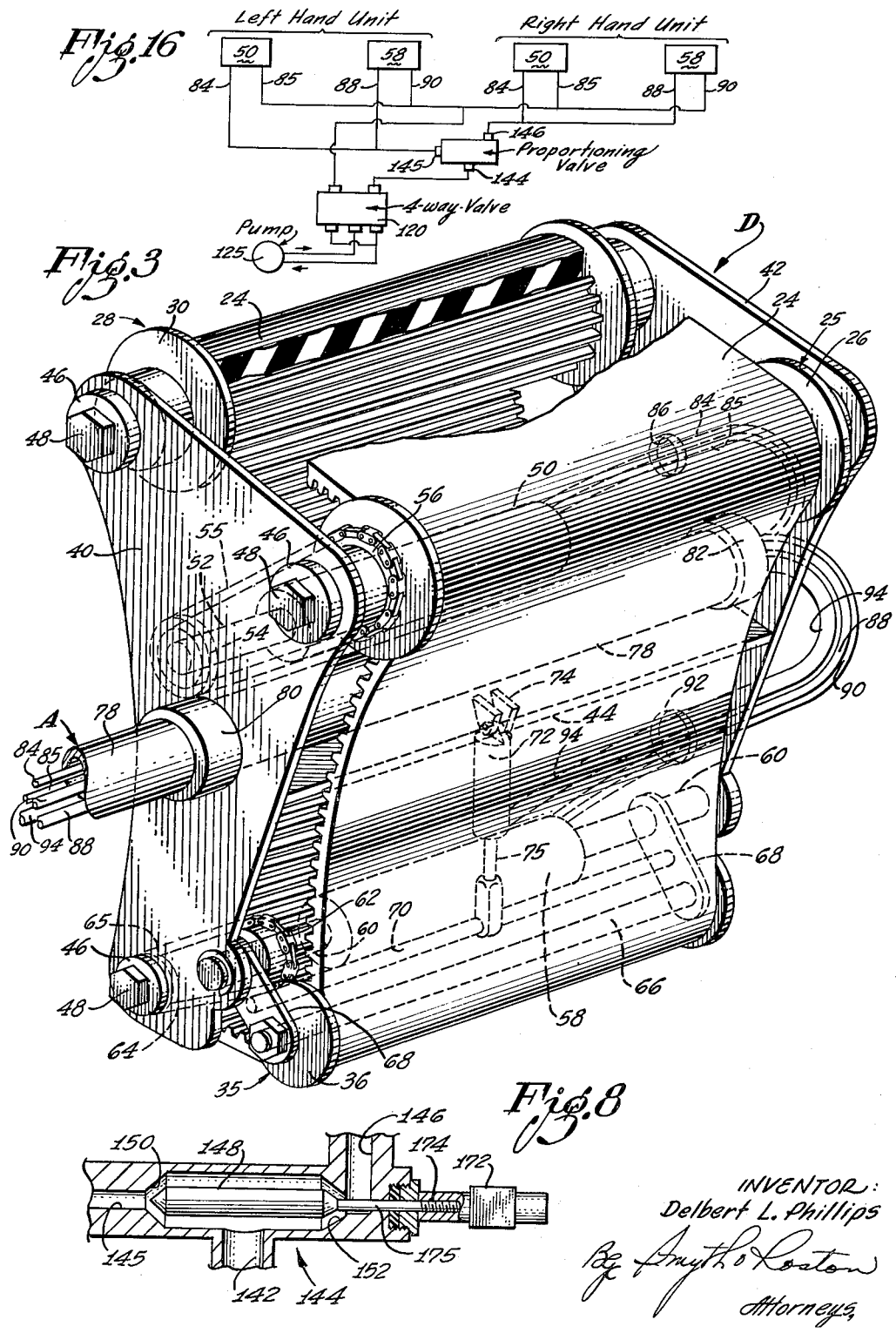

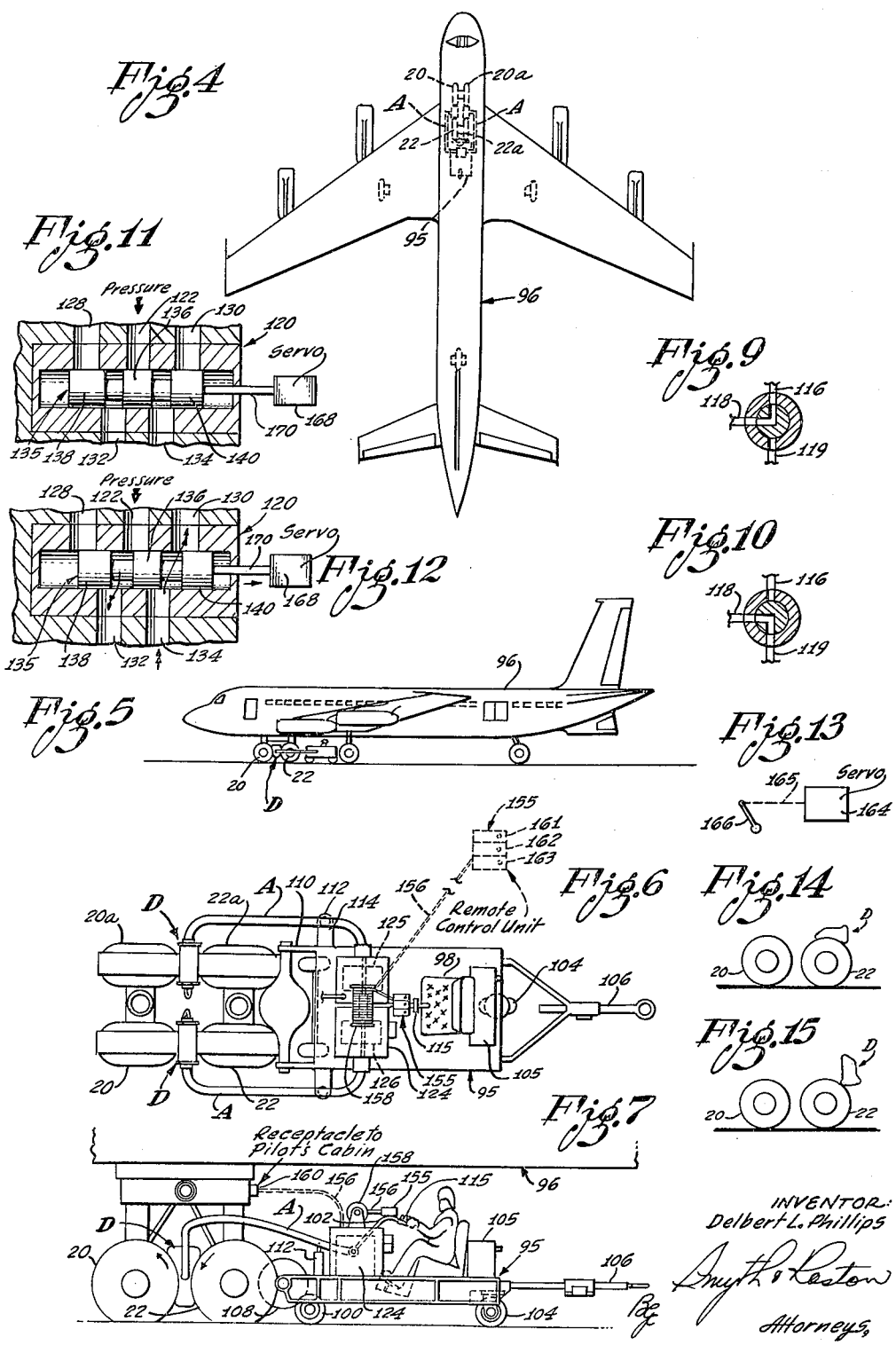

United States Patent Office 3,005,510
Patented Oct. 24, 1961

3,005,510
AUXILIARY DRIVE UNIT FOR VEHICLES
Delbert L. Phillips, 975 Somera Road,
Los Angeles 24, Calif.
Filed Mar. 9, 1959, Ser. No. 798,066
21 Claims. (Cl. 180—14)

This invention relates to a drive unit for moving a heavy vehicle. While the invention is widely applicable for driving various types of vehicles, it has special utility for moving large airplanes on the ground. Such a specialized drive unit has been selected for the present disclosure and will teach those skilled in the art how to apply the invention to other specific purposes.

It is frequently necessary to move a huge aircraft of many tons weight for a short distance on the ground when it is not practical to use the engines of the aircraft for that purpose especially when the engines are jet engines. The difficult problem encountered in any attempt to tow such an aircraft is that even a relatively large tow vehicle does not weigh enough to develop the required tractive force. The invention surmounts this difficulty by means making driving frictional contact with the peripheral surfaces of the aircraft landing wheels with sufficient pressure exerted over sufficient peripheral areas to cause rotation of the landing wheels and consequent movement of the aircraft. Thus the invention uses the weight of the aircraft itself for adequate traction.

The invention is based on the concept of employing a belt in the form of an endless loop positioned between two spaced tandem wheels and a special feature of the invention is that the two wheels may be of different diameters. A plurality of rotary means inside the belt loop spreads the belt loop into effective actuating contact with the two tandem wheels and at least one of these rotary means is power actuated to drive the belt. Such a drive unit may be constructed in various ways and supported in various ways in various practices of the invention.

In the embodiment of the invention selected for the present disclosure, a number of problems are solved by providing a relatively low auxiliary vehicle with at least one endless belt drive unit carried by the auxiliary vehicle and movable relative thereto to permit the unit to be positioned between tandem landing wheels of an aircraft. In the preferred embodiment of the invention there are two such drive units, each of which is carried by cantilever means on the auxiliary vehicle and both of which are energized by a power plant on the auxiliary vehicle.

With power means on the low auxiliary vehicle to control the cantilever means, it is a simple matter to maneuver the auxiliary vehicle under a large aircraft into position where the cantilever means may be used to place the two driving units in position to drive the two pairs of tandem landing wheels respectively of a set of four landing wheels. In this regard, a feature of the invention is the concept of making the two drive units contractible at their lower ends to permit the units to pass downward between the tandem wheels into operating positions. Once the two units are in operating positions, the lower portions of their belt loops are expanded to normal configurations for effective driving engagement with the two tandem wheels. Thereafter the auxiliary vehicle moves with and is towed by the aircraft as the drive units actuate the landing wheels.

The preferred practice of the invention is further characterized not only by the concept of reversing the operation of the two drive units as required to move the aircraft forward and rearward at will but also by the concept of varying the ratio of power delivered by the two drive units to cause changes in direction of the movement of the aircraft. A further feature is the provision of a remote control for the two drive units which may be on the auxiliary vehicle or may be on the aircraft that is being moved or may be remote from both the auxiliary vehicle and the aircraft. An electrical control system may be used for this purpose including a multiple-conductor cable of suitable length which may be connected to a master control on the auxiliary vehicle or may be connected to a master control on the aircraft or may be connected to a portable master control.

The preferred embodiment of the invention incorporates fluid motor means in each of the two drive units for actuation thereof and the auxiliary vehicle carries a power plant comprising a prime mover together with pump means driven thereby for energizing the fluid motors of the two drive units. Remotely actuated valve means reverses the fluid flow through the fluid motor means to reverse the direction of movement of the aircraft and remotely controlled valve means varies the relative rates of fluid flow to the two drive units to change the direction of movement of the aircraft.

The various features and advantages of the invention may be understood from the following detailed description together with the accompanying drawings.

In the drawings, which are to be regarded as merely illustrative:

FIG. 3 is a perspective view of the drive unit with portions broken away to reveal concealed structure;

FIG. 4 is a plan view of a large aircraft showing in dotted lines how an auxiliary vehicle incorporating the present invention may be positioned under the aircraft for driving the landing wheels of the aircraft;

FIG. 5 is a side elevational view of the same arrangement;

FIG. 6 is a plan view of the auxiliary vehicle shown in FIGS. 4 and 5, the auxiliary vehicle being equipped with two driving units, which driving units are engaged with corresponding pairs of tandem landing wheels of the aircraft.

FIG. 7 is a side elevational view of the same auxiliary vehicle;

FIG. 8 is a sectional view of a proportioning valve employed in the control system for the two drive units;

FIGS. 9 and 10 are sectional views of a three-way valve employed in the control system for the two drive units;

FIGS. 11 and 12 are sectional views of a four-way valve that is employed in the control system for the drive units;

FIG. 13 is a diagrammatic view showing a servo mechanism connected to a throttle for controlling the power delivered to the two drive units;

FIGS. 14 and 15 are diagrammatic views showing initial stages in the maneuvering of a drive unit into operative position between two tandem ground wheels; and FIG. 16 is a flow diagram of a portion of the control system.

Figure 1:
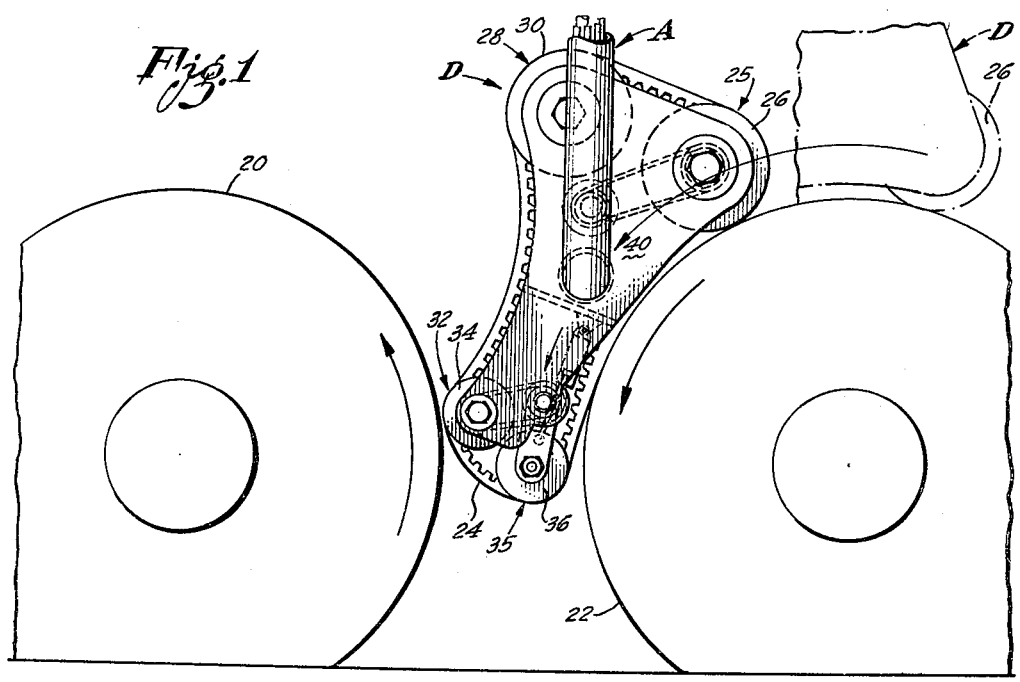
FIG. 1 is a side elevational view showing how a drive unit of the presently preferred embodiment of the invention may be contracted at its lower end for the purpose of permitting the drive unit to be moved downward between a pair of ground wheels to the operating position of the drive unit.
Figure 2:
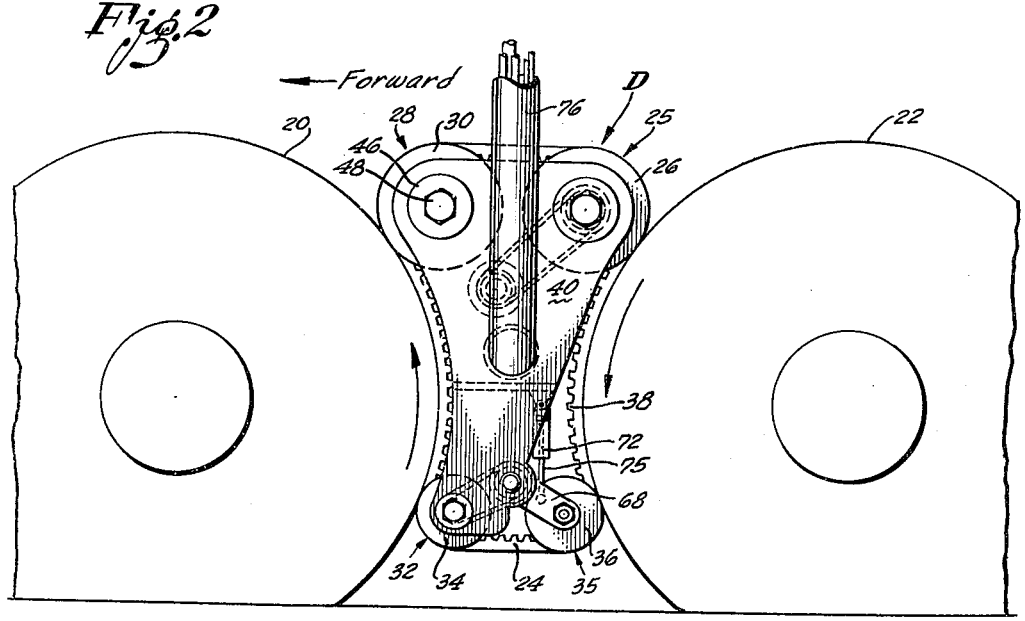
FIG. 2 is a similar view showing the drive unit at its operating position with its lower end expanded to normal configuration for effective contact with the two tandem ground wheels.

FIGS. 1 to 3 show the presently preferred embodiment of the drive unit, the drive unit being generally designated by the letter D. The drive unit D is constructed to function in cooperation with a pair of ground wheels 20 and 22 while are positioned in tandem. In this instance, the ground wheels 20 and 22 are a pair of tandem landing wheels of a large and heavy aircraft.

The drive unit D consists essentially of an endless drive belt 24 in the form of a loop for frictional driving contact with the two ground wheels 20 and 22, the drive belt loop enclosing a plurality of rotary members for the purpose of expanding the belt loop into contact with the two ground wheels and for the purpose of driving the belt. In this instance, the plurality of rotary members includes an upper axially elongated drive gear 25 having guide flanges 26, an upper idler gear 28 having guide flanges 30, a lower drive gear 32 having guide flanges 34 and a lower idler gear 35 having end guide flanges 36. The drive belt 24 is of a well-known internally reenforced construction having inner transverse rib-like teeth 38 for engagement by the drive and idler gears.

The drive unit D includes a suitable frame or support structure for the various gears that spread and control the drive belt loop. As best shown in FIG. 3, the frame structure may comprise essentially two spaced parallel upright side plates 40 and 42 interconnected by a substantially horizontal transverse plate 44. In the construction shown, the two side plates 40 and 42 are additionally rigidly interconnected by fixed axle members on which the two drive gears 25 and 32 and the idler gear 28 respectively are rotatably mounted. The ends of these axles may be secured by heavy washers 46 and corresponding cap screws 48 that are threaded into the ends of the axles.

The upper drive gear 25 and the lower drive gear 32 are actuated by power means which may be electrical means or hydraulic means or internal combustion means. In the present embodiment of the invention, the upper drive gear 25 is driven by a hydraulic motor 50 having a drive shaft 52. A drive sprocket 54 on the drive shaft 52 is connected by a sprocket chain 55 with a driven sprocket 56 that is unitary with the drive gear 25. In like manner, a second hydraulic motor 58 actuates a drive shaft 60 that is journaled in the two side plates 40 and 42 and carries a drive sprocket 62. The drive sprocket 62 is connected by a sprocket chain 64 with a driven sprocket 65 on the lower drive gear 32.

A feature of the present embodiment of the invention is the concept of the lower end of the drive belt loop being contractible in width to permit the drive unit to be lowered into operating position between the two tandem ground wheels in the manner indicated in FIG. 1. For this purpose, the lower idler gear 35 is mounted in some suitable manner to permit retraction of the idler gear from its normal operative position.

In the construction shown, this purpose is accomplished by mounting the idle gear 35 on an axle member 66 and mounting the axle member, in turn, on a pair of parellel arms 68. These arms 68 are pivoted at their inner ends on the previously mentioned drive shaft 60 and are rigidly interconnected by a cross bar 70.

A suitable hydraulic power cylinder 72 may be used to control the pair of arms 68. As indicated in FIG. 3, the upper end of the power cylinder is pivotally supported by a bracket 74 on the underside of the transverse plate 44 and a piston rod 75 extending downward from the power cylinder is pivotally connected to the cross bar 70. The piston rod 75 may be extended to swing the pair of arms downward to swing the idler gear 35 downward to elongate and narrow the belt loop, as shown in FIG. 5. The lower end of the belt loop is then sufficiently narrow to pass through the narrowest part of the gap between the two ground wheels 20 and 22.

In the normal operating state of the drive unit, the power cylinder 72 exerts upward pull on the pair of arms 68 to spread the belt loop in tension. It may be appreciated from an inspection of FIG. 2 that the tendency of the upward pull of the power cylinder to spread the two lower gears 32 and 35 apart will not only place the loop under tension, but will also create highly effective wedging actions. The tensioning of the loop of belt tends to wedge the upper pair of gears 25 and 28 down into the progressively narrowing gap between the two ground wheels and, in like manner, tends to wedge the lower pair of gears 32 and 35 upward into the progressively narrowing gap. With this hydraulically expanded arrangement, the drive belt 24 may be easily maintained under exceedingly high tension for highly effective frictional contract between the belt and the two ground wheels, not only in the regions of direct pressure by the drive gears and idler gears, but also in the two stretches of the drive belt that are pulled against the two ground wheels.

In the present embodiment of the invention, the drive unit D is mounted on a heavy tubular arm, generally designated A, which has a downwardly extending portion 76 terminating in a transverse end portion 78. This lower transverse end portion 78 extends through the two side plates 40 and 42 and is journaled therein by corresponding bearing sleeves 80 and 82. Thus the drive unit D is rotatably carried by the tubular arm A to be free to turn bodily to whatever position it may seek in response to the tensioning and driving of the belt 24.

A pair of hoses 84 and 85 extend through the arm A to the outer end thereof and turn back to enter the drive unit D through an opening 86 in the side plate 42 for connection to the upper hydraulic motor 50. A second pair of hoses 88 and 90 extend through the tubular arm and turn back through a second opening 92 in the side plate 42 for connection to the lower hydraulic motor 58. An additional hydraulic hose 94 also extends through the tubular arm A and through the same opening 92 in the side plate 42 for connection with the lower end of the hydraulic cylinder 72. It is apparent that the various flexible hoses permit the required freedom for rotation of the drive unit D on the arm A.

FIGS. 4 to 7 show how a pair of drive unit D may be carried by an auxiliary vehicle, generally designated 95, for maneuvering a large aircraft 96 on the ground. The aircraft 96 is provided with various landing wheels which include a forward set of four landing wheels. The four landing wheels of the set comprise the previously mentioned pair of tandem ground wheels 20 and 22 and a second similar pair of tandem ground wheels 20a and 22a. The two drive units D are carried by suitable pivoted contilever means comprising two tubular arms A which rotatably support the drive units in the manner previously described.

The auxiliary vehicle 95 has a seat 98 for a driver and has a forward pair of dirigible support wheels 100 for control by a steering member 102. The auxiliary vehicle has a single rear wheel 104 which is swiveled to function in the freely rotatable manner of a caster wheel but may be held in a neutral tracking position when desired by a suitable releasable latch means (not shown). The auxiliary vehicle has its own power plant 105 for driving the forward wheels 100, which power plant may be a small internal combustion engine. The auxiliary vehicle may be further provided with a rearwardly extending drawbar 106 by means of which it may be towed and maneuvered, if desired, instead of being driven by the power plant 105. To maneuver the auxiliary vehicle 95 into position for moving the aircraft 96, the caster wheel 104 is latched in its neutral position and the steering member 102 is manipulated to control the forward wheels 100.

The auxiliary vehicle 95 is suitably adapted to be held in tandem relation to the four landing wheels 20, 22, 20a and 22a as shown in FIGS. 6 and 7 when the two drive units D are in operation. For this purpose, a forward roller 108 may be journaled in a forwardly extending pair of arms 110 of the vehicle to press against the two rearward landing wheels 22 and 22a to maintain the auxiliary vehicle in alignment with the four landing wheels. As may be seen in FIG. 6, the roller 108 is of bulbous configuration for self-centering guiding engagement with the two rear landing wheels. With the two driving units D in operating positions for driving the two pairs of landing wheels, as shown in FIGS. 6 and 7, the auxiliary vehicle is held with the forward roller 108 in contact with the two rearward landing wheels. With the rear caster wheel 104 released for free swiveling action, the auxiliary vehicle will now stay in tandem with the four landing wheels of the aircraft and will follow any changes in direction of the aircraft.

The two tubular arms A on which the two drive units D are rotatably mounted may be raised and lowered by any suitable means. In this instance the arms A are controlled by a pair of hydraulic cylinders 112, respectively, which are mounted on corresponding rigid supports 114 that project laterally from the auxiliary vehicle.

A control means 115, which may be mounted on the steering member 102, comprises two three-way valves. One three-way valve is connected to the previously mentioned hydraulic hose 94 in each of the two drive units D, which hose is connected to the lower end of the corresponding hydraulic cylinder 72. The other three-way valve is connected to the two hydraulic cylinders 112 that control the two arms A. Each of these two three-way valves may be of the construction shown in FIGS. 9 and 10. In FIG. 9, the control valve is positioned for placing a pressurized supply pipe 116 in communication with a pipe 118.

For control of the two belt-tightening hydraulic cylinders 72 of the two drive units D, the pipe 118 is connected to the two corresponding hoses 94. Thus, when the three-way valve is in the position shown in FIG. 9, it places the two hydraulic cylinders 72 in communication with the pressurized fluid source to exert upward pull on the two corresponding piston rods 75 to cause the two lower idler gears 35 of the drive units to spread and tension the corresponding belt loops. When the three-way valve is turned to the second position shown in FIG. 10, the supply pipe 116 is cut off and the pipe 118 is placed in direct communication with a return pipe 119 which is at substantially atmospheric pressure.

In the same manner, the other three-way valve in the control means may be used to create pressure at will in the two hydraulic cylinders 112 for controlling the elevation of the two arms A. Once the two drive units D are in their operating positions for driving the two pairs of landing wheels, pressure is released in the two hydraulic cylinders 112 to permit the two drive units to seek their own levels and pressure is applied and maintained in the two hydraulic cylinders 72 to cause the two belt loops to be tensioned into driving contact with the corresponding ground wheels. Thereafter, in the course of maneuvering the aircraft 96 on the ground, there is no need to touch the control means 115 on the steering member 102.

In the present embodiment of the invention, it is contemplated that the two drive units D will be top heavy when in the positions shown in FIGS. 1 and 2. In other words, in the absence of restraint, each of the drive units D will tend to take an upside-down position, as indicated in FIG. 15. This tendency of each of the drive units to gravitate to the position shown in FIG. 15 is useful in the maneuvering of the two drive units into their operative positions.

When the auxiliary vehicle 95 approaches the two pairs of landing wheels of the aircraft from the rear, the two arms A are elevated by operation of the two hydraulic cylinders 112 to place each of the two drive units in a position shown in FIG. 14. The auxiliary vehicle is then moved forward slowly to cause each of the two drive units D to swing to a reclining position on the rearward landing wheel of the corresponding pair of tandem landing wheels, the reclining position being shown in FIG. 14. The hydraulic pressure in the two hydraulic cylinders 112 is then released to free the two arms A for downward gravitation and the auxiliary vehicle is advanced slowly to cause the two drive units D to ride over the rearward ground wheels in the manner indicated in FIG. 1. The pressure in the two hydraulic cylinders 72 is released at this time for retraction of each of the lower idler gears 35 to permit each drive unit to pass downward through the narrow gap between the corresponding two landing wheels with the drive belt slack. When each driving unit reaches the position shown in FIG. 2, pressure is restored in the two hydraulic cylinders 72 for expansion of the two drive belts 24 to their normal operating configurations in pressure contact against the landing wheels.

The two hydraulic motors 50 and 58 may be controlled in unison by a three-position four-way valve which is generally designated by numeral 120 in FIGS. 11 and 12. One port 122 of the four-way valve 120 is connected to a pressurized fluid source for actuation of the two hydraulic motors 50 and 58. In this particular practice of the invention, the pressurized fluid source is in a housing 124 in the auxiliary vehicle 95 and comprises a rotary pump 125 and a power plant 126 for driving the rotary pump. The power plant 126 may be an internal combustion engine.

The four-way valve 120 includes a pair of ports 128 and 130 which are connected to a low pressure return line for returning the hydraulic fluid to the housing 124 for recirculation through the pump 125. The four-way valve 120 has a port 132 that is in communication with the hydraulic hoses 84 and 88 of the two drive units and has a port 134 that is in communication with the two hydraulic hoses 85 and 90. In a well-known manner, the four-way valve 120 has a longitudinally movable valve spool, generally designated 135. The valve spool 135 has a central enlargement 136 for cooperation with the supply port 122, an end enlargement 138 for cooperation with the ports 128 and 132, and a second end enlargement 140 for cooperation with the ports 130 and 134.

When the valve spool 135 is in its central neutral position, as shown in FIG. 11, the central enlargement 136 cuts off the pressurized supply port 122 for deenergization of the hydraulic motors 50 and 58. When the valve spool is shifted to the right from its central position, as shown in FIG. 12, the supply port 122 for the pressurized fluid is placed in communication with the port 132 to drive the two hydraulic motors 50 and 58 in one rotary direction with the fluid from the hydraulic motors returning to flow through the ports 134 and 130 of the valve, as indicated in FIG. 12. When the valve spool 135 is shifted in similar manner to the left, the pressurized fluid is delivered to the port 134 for driving the two hydraulic motors 50 and 58 in their opposite directions, the hydraulic fluid returning through ports 132 and 128.

In the present embodiment of the invention, it is further contemplated that means will be provided to proportion the pressurized hydraulic fluid variably between the two drive units to cause changes in direction of travel of the aircraft whenever desired. For this purpose, the port 132 of the four-way valve 120 is connected to a port 142 of a proportioning valve 144 of the construction shown in FIG. 8. A second port 145 of the proportioning valve (FIG. 8) is connected to the two hoses 84 and 88 of one of the two drive units D (FIG. 15) and a third port 146 of the proportioning valve is connected to the two hoses 84 and 88 of the other of the two drive units D.

The proportioning valve 144 has a central valve member 148 with tapered ends for cooperation with two opposite tapered valve seats 150 and 152 that communicate with the two valve ports 145 and 146, respectively. When the valve member 148 is in its central position shown in FIG. 8, the pressurized hydraulic fluid flows through the two drive units D at equal rates to cause the aircraft to move straight ahead or straight back in accord with the adjustment of the four-way valve 120. If the proportioning valve member 148 is shifted to the left from its central position, as viewed in FIG. 8, fluid flow through the valve port 145 will be reduced and fluid flow through the valve port 146 will be correspondingly increased to cause the right driving unit to operate faster than the left driving unit to cause the right pair of landing wheels 20a and 22a to rotate faster than the left landing wheels 20 and 22, with consequent turning of the aircraft to the left.

The present embodiment of the invention is further characterized by the concept of providing a control unit on the end of an electric cable not only for remote control of the four-way valve 120 and remote control of the proportioning valve 144, but also for remote control of the speed of operation of the power plant 126 that drives the pump 125. The master control unit, generally designated 155 in FIGS. 6 and 7, has a control cable 156 that is removably plugged into the control unit and is normally wound on a reel 158.

Normally the master control unit 155 is releasably mounted on the steering member 102 with the cable fully wound on the reel 158. If desired, however, the remote control unit 155 may be removed from the steering member 102 and the cable may be unwound from the reel 158 to permit the remote control unit to be manipulated at a distance from the auxiliary vehicle. If desired, the cable 156 may be disconnected from the master control unit 155 entirely and plunged into a receptacle 160 on the aircraft as indicated in dotted lines in FIG. 7, the control cable being thus connected with a duplicate remote control unit in the cabin of the aircraft.

As indicated in dotted lines in FIG. 6, the master control unit 155 comprises three controls 161, 162 and 163. The control 161 is electrically connected to a servo or remote actuator 164 which is shown diagrammatically in FIG. 13 as having an operative connection 165 with the throttle 166 that controls the speed of the power plant 126 and thereby controls the rate of forward or rearward movement of the aircraft. The control 162 is electrically connected to a suitable servo or remote actuator 168 which, as shown in FIGS. 11 and 12, is connected to the valve spool 135 by an actuating valve stem 170. The servo 168 is a follow-up means of any suitable construction that responds to adjustments of the control 162 in a well-known manner. Finally, the third control 163 is electrically connected to a servo 172 shown in FIG. 8 for controlling the proportioning valve 144. The servo 172 may be a reversible motor which actuates a rotary nut (not shown) in engagement with a screw thread 174 on a valve stem 175 that is integral with the proportioning valve member 148. Thus, the reversible motor 172 may be remotely actuated to shift the valve member 148 for varying the relative rates of flow to the two drive units for controlling the direction of movement of the aircraft.

My description in specific detail of the selected embodiment of the invention will suggest various changes, substitutions and other departures from my disclosure within the spirit and scope of the appended claims.

I claim:

1. A drive unit to drive a vehicle that has a pair of spaced ground wheels aligned with each other in tandem, said unit comprising: support means for positioning between the two wheels; a flexible belt in the form of a continuous loop; a plurality of rotary means inside said loop and carried by said support means in rolling contact with the inner surface of said belt to spread said loop into pressure contact with said two wheels; at least one power-actuated rotary means included in said plurality of means and engaging said belt to drive said loop; and support structure pivotally supporting said support means for rotation of the support means about a transverse axis inside said loop to permit said support means to turn bodily to whatever rotary position it may seek in response to the tensioning and driving of said loop.

2. A drive unit to drive a vehicle that has a pair of spaced ground wheels aligned with each other in tandem, said unit comprising: support means for positioning between the two wheels; a flexible belt in the form of a continuous loop; a plurality of rotary means inside said loop and carried by said support means to spread said loop into pressure contact with said two wheels, said plurality of rotary means including two rotary means spreading the lower part of the loop below the level of the axis of the two wheels, at least one of said two rotary means being retractable to narrow the lower part of the loop to permit the unit to be moved downward between the wheels into operating position; and at least one power-actuated rotary means included in said plurality of means and engaging said belt to drive said loop.

3. A drive unit to drive a vehicle that has a pair of spaced ground wheels aligned with each other in tandem, said unit comprising: support means for positioning between the two wheels; a flexible belt in the form of a continuous loop, a plurality of rotary means inside said loop and carried by said support means to spread the loop into pressure contact with the two wheels, said plurality of means including a first power-actuated rotary means together with a first rotary idler means pressing said loop against circumferentially spaced points of one of said two wheels, said plurality of means including a second power-actuated rotary means together with a second rotary idler means pressing said loop against circumferential spaced points of the other of the two wheels; and at least one power-actuated rotary means included in said plurality of means and engaging said belt to drive said loop.

4. A drive unit as set forth in claim 3 in which said first power-actuated rotary means and said second rotary idler means are at the upper part of the loop and said second power-actuated rotary means and said first rotary idler means are at the lower part of the loop.

5. A drive unit as set forth in claim 4 in which at least one of said two rotary means at the lower part of the loop is retractable to narrow the lower part of the loop to permit the unit to be moved downward between the wheels into operating position.

6. A drive unit to drive a vehicle that has a pair of spaced ground wheels aligned with each other in tandem, comprising: support means for positioning between the two wheels; fluid motor means carried by said support means; means to deliver fluid under pressure to said fluid motor means; a flexible belt in the form of a continuous non-circular loop; a plurality of rotary means carried by said support means inside said loop in engagement with the loop to spread the loop into pressure contact with portions of substantial circumferential extent of both of said wheels, at least one of said plurality of means being operatively connected with said fluid motor means for actuation thereby; and power actuated means inside said loop to exert force on said plurality of means to spread the plurality of means.

7. Auxiliary power means to drive a main vehicle having two spaced ground wheels aligned with each other in tandem, comprising: an auxiliary vehicle; a power plant on said auxiliary vehicle; a flexible belt in the form of a continuous loop; support means carried by said auxiliary vehicle for positioning between said two wheels; a plurality of rotary means inside said loop and carried by said support means to spread said loop into pressure contact with portions of substantial circumferential extent of said two wheels, at least one of the rotary means of said plurality of rotary means being operatively connected with said power plant for actuation thereby to drive said belt; and power means to spread said plurality of rotary means to tension said loop and press the loop against said ground wheels.

8. Auxiliary power means as set forth in claim 7 in which said power plant comprises a prime mover and a pump driven thereby; and said means actuated by the power plant is fluid motor means connected to said pump.

9. An auxiliary power means as set forth in claim 7 which includes means to couple said auxiliary vehicle with said main vehicle for movement therewith.

10. An auxiliary power means as set forth in claim 9 which includes remote control means for said power actuated rotary means, said remote control means being on said auxiliary vehicle.

11. Means to drive a vehicle having a set of four ground wheels comprising two pairs of wheels spaced apart laterally of the vehicle, each pair being two spaced wheels aligned with each other in tandem, said drive means comprising: two drive units positioned respectively between the two wheels of each of said pairs of wheels; a belt in the form of an endless loop included in each of said drive units; a plurality of rotary means included in each of said units inside the corresponding loop in rolling engagement with the belt inside the loop to spread the loop into pressure contact with substantial circumferential portions of the corresponding two wheels, each of said plurality of means including at least one power-actuated rotary means to drive the belt; and remote control means to control energization of the power-actuated rotary means of the two drive units for moving said vehicle and to vary the relative power output of the power-actuated rotary means of the two drive units for changing the direction of travel of the vehicle.

12. A combination as set forth in claim 11 in which each of said power-actuated rotary means is coupled to a corresponding fluid motor and which includes: a power-driven pump remote from the two units to deliver fluid to said fluid motors for actuation thereof; and means to variably proportion the fluid between the two drive units to change the direction of travel of the vehicle.

13. A combination as set forth in claim 12 which includes means to reverse the direction of flow between the pump and the fluid motors to reverse the direction of movement of the vehicle.

14. Auxiliary power means to drive a main vehicle having a set of four ground wheels comprising two pairs of wheels spaced apart laterally of the vehicle, each pair being two spaced wheels aligned with each other in tandem, said drive means comprising, an auxiliary vehicle to accompany said main vehicle; a power plant on said auxiliary vehicle; two drive units carried by said auxiliary vehicle and movable relative thereto for positioning respectively between the two wheels of each of said two pairs of wheels; a belt in the form of an endless loop included in each of said drive units; and a plurality of rotary means included in each of said units inside the corresponding loop of belt to engage the belt and spread the loop into pressure contact with the corresponding two wheels, each of said pluralities of rotary means including at least one rotary actuating means to drive the belt, each of said rotary actuating means being connected with said power plant for energization thereby.

15. An auxiliary power means as set forth in claim 14 which includes means remote from said two drive units to control energization of said two rotary actuating means selectively.

16. Auxiliary power means as set forth in claim 14 which includes two arms pivoted on said auxiliary vehicle and carrying said two drive units respectively; and which includes means to actuate said arms to move said drive units into operating positions at said two pairs of wheels.

17. Auxiliary power means to drive a main vehicle having a set of four ground wheels comprising two pairs of wheels spaced apart laterally of the vehicle, each pair being two spaced wheels aligned with each other in tandem, said drive means comprising: an auxiliary vehicle to accompany said main vehicle; a power plant on said auxiliary vehicle; pump means on said auxiliary vehicle driven by said power plant; two drive units carried by said auxiliary vehicle and movable relative thereto for positioning respectively between the two wheels of each of said two pairs of wheels; a belt in the form of an endless loop included in each of said two drive units; fluid motor means included in each of said drive units and connected with said pump means for actuation thereby; and a plurality of rotary means included in each of said units inside the corresponding loop of belt to engage the belt and spread the loop into pressure contact with the corresponding two wheels, each of said plurality of means including at least one driving rotary means actuated by the corresponding fluid motor means and engaging the corresponding belt for actuation thereof to move said main vehicle.

18. An auxiliary power means as set forth in claim 17 which includes means to reverse the flow of fluid through said fluid motor means for reversing the direction of travel of said main vehicle and includes means for varying the ratio of the fluid flow to the two drive units for changing the direction of travel of the main vehicle.

19. An auxiliary power means as set forth in claim 18 which includes remote control means for said flow-reversing means and for said ratio-varying means.

20. An auxiliary power means as set forth in claim 19 in which said remote control means may be positioned selectively on said auxiliary vehicle and said main vehicle.

21. A drive unit to drive a vehicle that has a pair of spaced ground wheels aligned with each other in tandem comprising: support means for positioning between the two wheels; a flexible belt in the form of a continuous loop; a plurality of rotary means carried by said support means inside said loop in engagement with the loop to spread the loop into pressure contact with both of said wheels, at least one of said plurality of rotary means being power actuated to drive said loop, said plurality of rotary means including a pair of rotary means spaced above the level of the axes of said ground wheels and spaced apart farther than the distance between the ground wheels, said plurality of rotary means including a second pair of rotary means below the level of the axes of said ground wheels and normally spaced apart farther than the distance between the ground wheels; and power actuated means to spread apart one of said two pair of rotary means thereby to tend to pull the two pair of rotary means towards each other with consequent increase in the pressure of the loop against the ground wheels.

References Cited in the file of this patent
UNITED STATES PATENTS

| | | |
|---|---|---|
| 1,394,328 | Miller | Oct. 18, 1921 |
| 2,409,552 | Donnellan | Oct. 15, 1946 |
| 2,717,654 | Andersen | Sept. 13, 1955 |